United States Patent
Nakashima et al.

(10) Patent No.: US 10,821,794 B2
(45) Date of Patent: Nov. 3, 2020

(54) SUPPORTING STRUCTURE FOR SHOCK ABSORBER OF SUSPENSION DEVICE AND SUSPENSION STRUCTURE OF UTILITY VEHICLE

(71) Applicant: KAWASAKI JUKOGYO KABUSHIKI KAISHA, Hyogo (JP)

(72) Inventors: Yusuke Nakashima, Kobe (JP); Takashi Hisamura, Akashi (JP)

(73) Assignee: KAWASAKI JUKOGYO KABUSHIKI KAISHA, Hyogo (JP)

(*) Notice: Subject to any disclaimer, the term of this patent is extended or adjusted under 35 U.S.C. 154(b) by 0 days.

(21) Appl. No.: 16/726,381

(22) Filed: Dec. 24, 2019

(65) Prior Publication Data

US 2020/0130450 A1  Apr. 30, 2020

Related U.S. Application Data

(63) Continuation-in-part of application No. 15/937,258, filed on Mar. 27, 2018.

(51) Int. Cl.
- *B60G 15/06* (2006.01)
- *B60G 1/04* (2006.01)
- *B60G 11/58* (2006.01)

(52) U.S. Cl.
CPC ............ *B60G 15/068* (2013.01); *B60G 1/04* (2013.01); *B60G 11/58* (2013.01); *B60G 2200/156* (2013.01); *B60G 2202/312* (2013.01); *B60G 2300/07* (2013.01)

(58) Field of Classification Search
CPC ........ B60G 15/068; B60G 1/04; B60G 11/58; B60G 2300/07; B60G 2202/312; B60G 2200/156

See application file for complete search history.

(56) References Cited

U.S. PATENT DOCUMENTS

| | | | |
|---|---|---|---|
| 5,961,135 A | 10/1999 | Smock | |
| 7,837,214 B2 * | 11/2010 | Tribotte | B62K 25/286 280/283 |
| 8,464,827 B2 | 6/2013 | Tsumiyama et al. | |
| 9,434,244 B2 | 9/2016 | Sunsdahl | |
| 2009/0301830 A1 * | 12/2009 | Kinsman | B60G 15/063 188/289 |
| 2009/0302590 A1 * | 12/2009 | Van Bronkhorst | B60G 15/063 280/756 |
| 2011/0048833 A1 * | 3/2011 | Schapf | B60G 3/20 180/233 |
| 2013/0175779 A1 * | 7/2013 | Kvien | B60G 3/20 280/124.15 |
| 2014/0251712 A1 | 9/2014 | Brady | |
| 2015/0259011 A1 | 9/2015 | Deckard | |
| 2016/0347137 A1 * | 12/2016 | Despres-Nadeau | B60G 7/005 |
| 2019/0211915 A1 * | 7/2019 | Davis | F16H 57/0416 |
| 2019/0248405 A1 * | 8/2019 | Bennett | B62D 21/183 |

* cited by examiner

*Primary Examiner* — Darlene P Condra
(74) *Attorney, Agent, or Firm* — Wenderoth, Lind & Ponack, L.L.P.

(57) ABSTRACT

A suspension structure of a utility vehicle includes: a shock absorber; a knuckle; and an upper arm and a lower arm which connects the knuckle to a vehicle body frame of the utility vehicle, wherein a recessed portion which is recessed downward is formed on the upper arm, and a lower end of the shock absorber is supported by the recessed portion.

12 Claims, 15 Drawing Sheets

SUPPORTING STRUCTURE FOR SHOCK ABSORBER OF SUSPENSION DEVICE AND SUSPENSION STRUCTURE OF UTILITY VEHICLE

BACKGROUND OF THE INVENTION

1. Field of the Invention

The present invention relates to a supporting structure for a shock absorber of a suspension device and a suspension structure of a utility vehicle.

2. Description of the Related Art

Conventionally, as described in U.S. Pat. No. 8,464,827 specification, a shock absorber of a suspension device of a utility vehicle is configured to be supported by a vehicle body frame by way of a bracket or the like.

SUMMARY OF THE INVENTION

When the shock absorber is formed of a pair of right and left shock absorbers, the respective shock absorbers are supported on a vehicle body frame by way of different bracket. Accordingly, there may be considered a case where when the vehicle body frame receives a large load from the right and left shock absorbers, the load cannot be smoothly dispersed in the vehicle body frame.

Accordingly, it is an object of the present invention to provide a supporting structure for a shock absorber which easily disperses a load from a shock absorber.

To achieve the object of the present invention, according to a first aspect of the present invention, there is provided a supporting structure for a shock absorber of a suspension device of a utility vehicle, the supporting structure for a shock absorber which includes: a pair of right and left shock absorbers; and a transverse frame extending in a vehicle width direction, wherein the both shock absorbers are supported on the transverse frame by way of one bracket from below the transverse frame, and the transverse frame extends from both sides of the bracket toward the outside in the vehicle width direction in an upwardly inclined manner.

With such a configuration, the transverse frame extends from both sides of one bracket on which both shock absorbers are mounted toward the outside in the vehicle width direction in an upwardly inclined manner. Accordingly, loads transmitted to the shock absorbers from below are easily transmitted to the transverse frame. As a result, it is possible to provide a supporting structure for a shock absorber which can easily disperse loads from the shock absorbers.

It is preferable that the supporting structure for a shock absorber according to the first aspect further include the following configuration.

(1) An upper end of the transverse frame is connected to a rollover protective structure (ROPS).

(2) The bracket is supported on a lower frame which extends in a vertical direction, has a lower end supported on a vehicle body frame, and has an upper end connected to the bracket.

(3) In the configuration (2), as viewed in a side view of the utility vehicle, the shock absorbers extend frontward in a downwardly inclined manner, the transverse frame extends rearward in an upwardly inclined manner, and the lower frame extends rearward in a downwardly inclined manner.

(4) In the configuration (3), as viewed in a side view of the utility vehicle, the transverse frame and the lower frame are disposed so as to make a right angle between the transverse frame and the lower frame.

(5) In the configuration (2), as viewed in a front view of the utility vehicle, extensions in an upward direction of the respective right and left shock absorbers and an extension in an upward direction of the lower frame are merged together at one point on the transverse frame.

According to the configuration (1), the transverse frame is connected to the ROPS and hence, the transverse frame which receives loads from the shock absorbers can transmit the loads to the ROPS whereby the supporting structure for a shock absorber can more effectively disperse the loads.

According to the configuration (2), the bracket is supported from below by the lower frame and hence, a strength of supporting the bracket can be enhanced.

According to the configuration (3), loads from the shock absorbers can be easily transmitted to the transverse frame and the lower frame.

According to the configuration (4), loads from the shock absorbers can be more easily transmitted to the transverse frame and the lower frame.

According to the configuration (5), loads from the shock absorbers can be easily transmitted to the transverse frame and the lower frame.

According to a second aspect of the present invention, there is provided a suspension structure of a utility vehicle, the suspension structure which includes:
a shock absorber;
a knuckle; and
an upper arm and a lower arm which connects the knuckle to a vehicle body frame of the utility vehicle, wherein
a recessed portion which is recessed downward is formed on the upper arm, and
a lower end of the shock absorber is supported by the recessed portion.

With such a configuration, the lower end of the shock absorber is supported by the recessed portion of the upper arm and hence, a total length of a shock absorber can be surely increased and a moving distance of a wheel in a vertical direction can be surely increased.

It is preferable that the suspension structure of a utility vehicle according to the second aspect further include the following configuration.

(1) A bottom surface of the recessed portion is positioned substantially at the same height in a vertical direction as a support surface of the knuckle on which the knuckle supports the upper arm, or below the support surface.

(2) An upper end of the shock absorber extends in a vehicle width direction, and is supported by a portion of a bonnet frame in a vicinity of a center portion of the bonnet frame in the vehicle width direction, the bonnet frame being positioned in a vicinity of a bonnet.

(3) A stopper which regulates a displacement angle between the lower arm and the knuckle is formed on the knuckle.

(4) The lower arm has a bent portion that bends upward at an intermediate portion of the lower arm in the vehicle width direction.

According to the configuration (1), the bottom surface of the recessed portion is set substantially at the same height in the vertical direction as the support surface of the knuckle on which the knuckle supports the upper arm or below the support surface. Accordingly, a total length of the shock absorber can be surely increased.

According to the configuration (2), the upper end of the shock absorber is supported by the portion of the bonnet frame in the vicinity of the center portion of the bonnet frame in the vehicle width direction. Accordingly, it is possible to prevent the bonnet from obstructing visibility on a front side by suppressing a height of the bonnet while ensuring a total length of the shock absorber.

According to the configuration (3), when the shock absorber is extended maximally, a displacement angle between the lower arm and the knuckle is regulated within a predetermined range. Accordingly, the amount of wheel travel (tire stroke) can be ensured.

According to the configuration (4), the lower arm has the bent portion that bends upward at the intermediate portion of the lower arm in the vehicle width direction. Accordingly, it is possible to reduce a possibility that an obstacle is caught by the arm and hence, drivability of a utility vehicle on a rough road can be improved.

According to a third aspect of the present invention, there is provided a suspension structure of a utility vehicle, the suspension structure which includes:

a shock absorber;

a knuckle; and an upper arm and a lower arm which connects the knuckle to a vehicle body frame of the utility vehicle, wherein a stopper which regulates a displacement angle between the lower arm and the knuckle is formed on the knuckle.

With such a configuration, when the shock absorber is extended maximally, a displacement angle between the lower arm and the knuckle is regulated within a predetermined range. Accordingly, the amount of wheel travel (tire stroke) can be ensured.

As a result, according to the present invention, it is possible to provide a supporting structure for a shock absorber which can easily disperse loads from the shock absorbers.

DETAILED DESCRIPTION OF THE PREFERRED EMBODIMENTS

Hereinafter, a utility vehicle having a supporting structure for a shock absorber of a suspension device according to one embodiment of the present invention is described with reference to attached drawings. The utility vehicle is a vehicle for off-road traveling which travels not only on a grass field, a gravel field and a sandy field but also on an unpaved mountain road, a forest road, a muddy road, a rocky area or the like. For the sake of convenience of the description, an advancing direction of the utility vehicle is assumed as a "front side" of the utility vehicle and respective parts, and right and left sides in a vehicle width direction when an occupant riding on the utility vehicle faces forward are assumed as "right and left sides" of the utility vehicle and the respective parts.

[Entire Structure of Vehicle]

Figure 1:
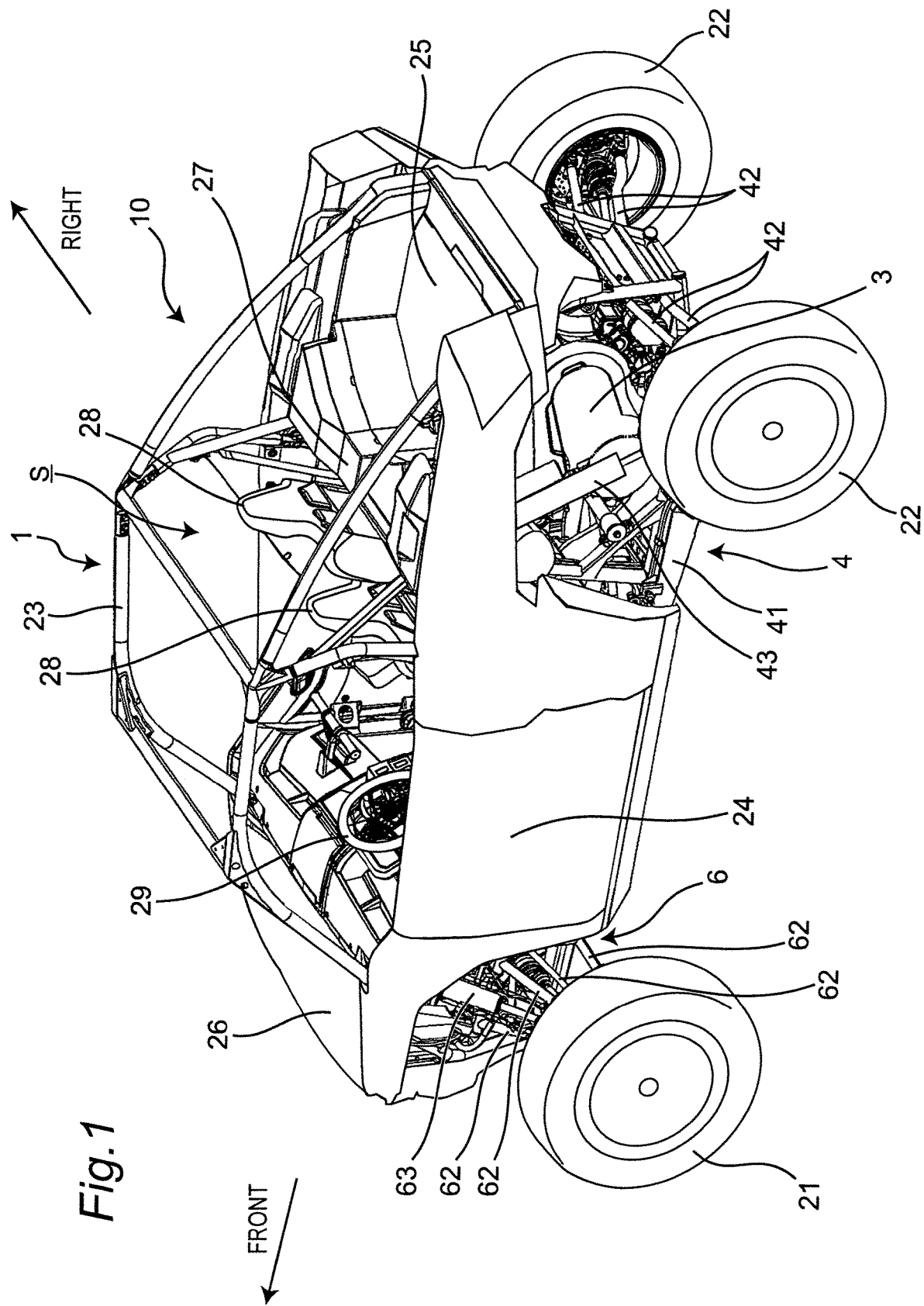
FIG. 1 is a perspective view of a utility vehicle having a supporting structure for a shock absorber according to one embodiment of the present invention.
Figure 2:
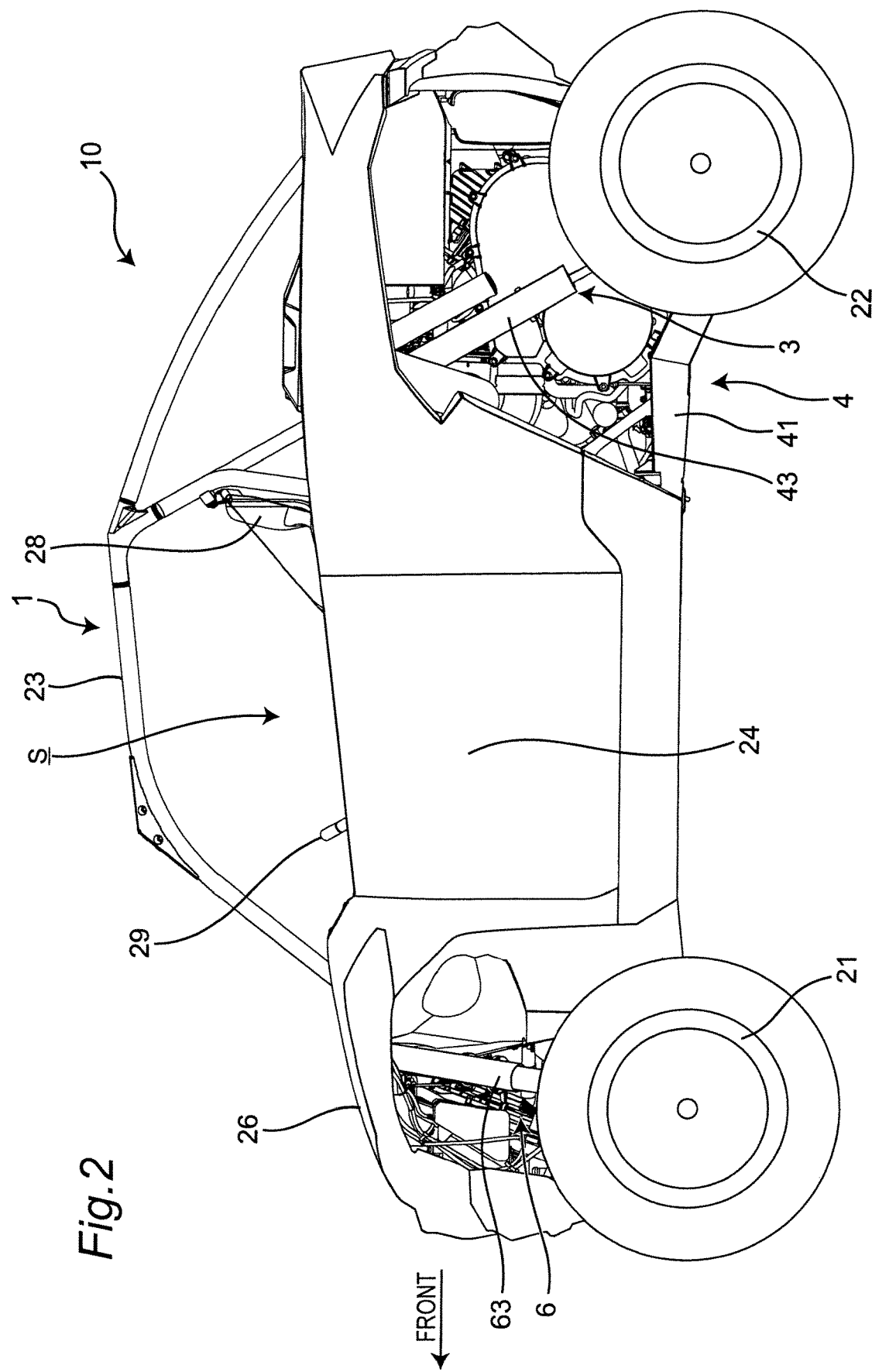
FIG. 2 is a left side view of the utility vehicle shown in FIG. 1.

FIG. 1 is a perspective view of a utility vehicle which has a supporting structure for a shock absorber of a suspension device according to one embodiment of the present invention, and FIG. 2 is a left side view of the utility vehicle shown in FIG. 1.

As shown in FIG. 1 and FIG. 2, a utility vehicle 10 includes a pair of right and left front wheels 21 on a front portion of a vehicle body and a pair of right and left rear wheels 22 on a rear portion of the vehicle body. The utility vehicle 10 includes a riding space (cabin) S between the front wheels 21 and the rear wheels 22. The riding space S is surrounded by a ROPS 23, and a pair of right and left doors 24. The ROPS is an abbreviation of "rollover protective structure", and is a part of a vehicle body frame 1.

A cargo bed 25 is disposed behind the riding space S, and a bonnet 26 is disposed in front of the riding space S. A back panel 27 which partitions the cargo bed 25 and the riding space S from each other is mounted on a front end of the cargo bed 25.

A pair of right and left independent-type seats 28 is disposed in the inside of the riding space S. An operating part such as a steering wheel 29 is disposed in front of the seat 28.

A power unit 3 is disposed below the cargo bed 25. The power unit 3 includes an engine and a transmission. A driving force of the engine is transmitted to the transmission, and the transmission transmits the driving force to the pair of right and left front wheels 21 and the pair of right and left rear wheels 22.

Figure 3:
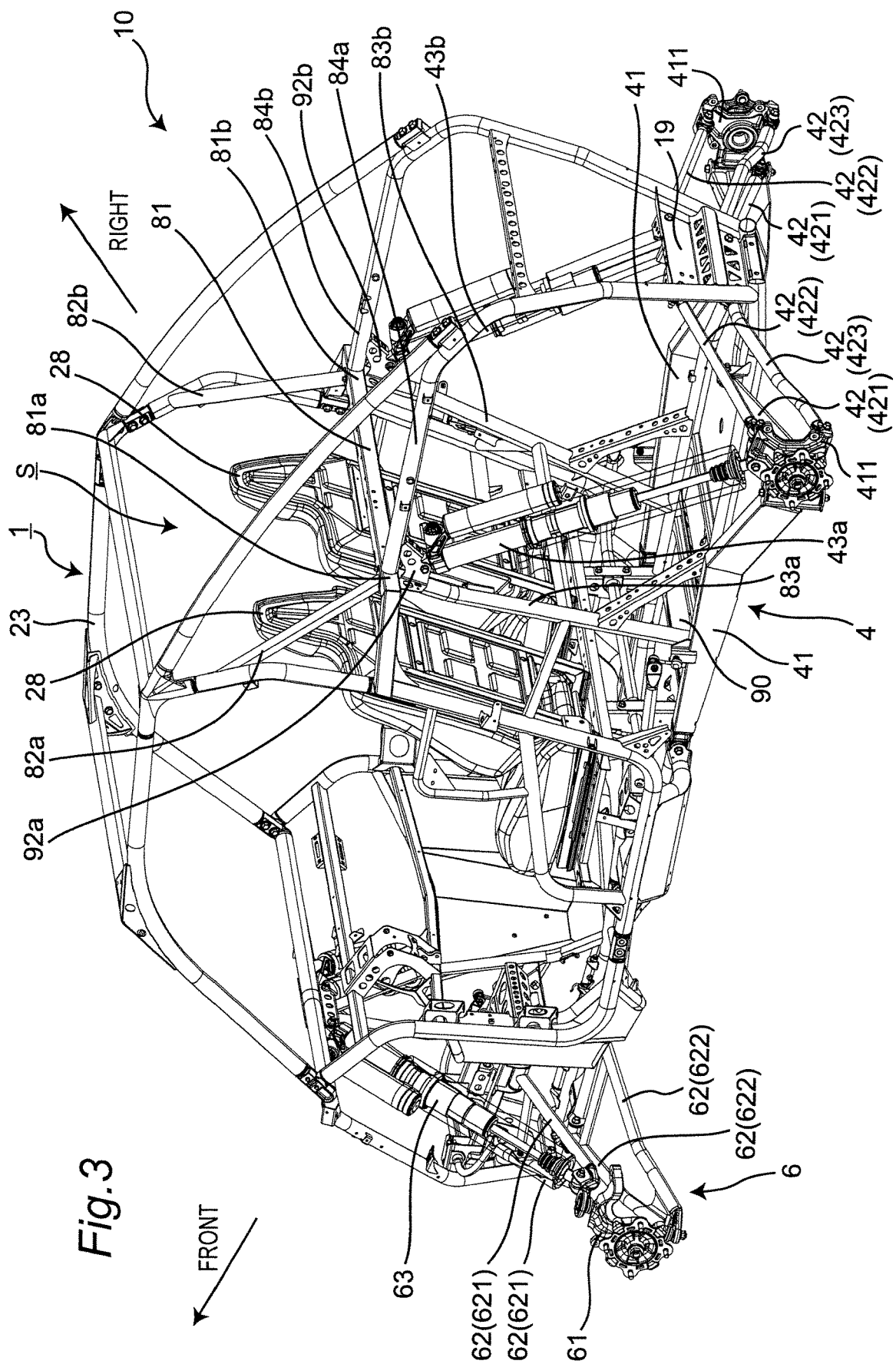
FIG. 3 is a perspective view of the utility vehicle showing a supporting structure for a shock absorber of a suspension device.
Figure 4:
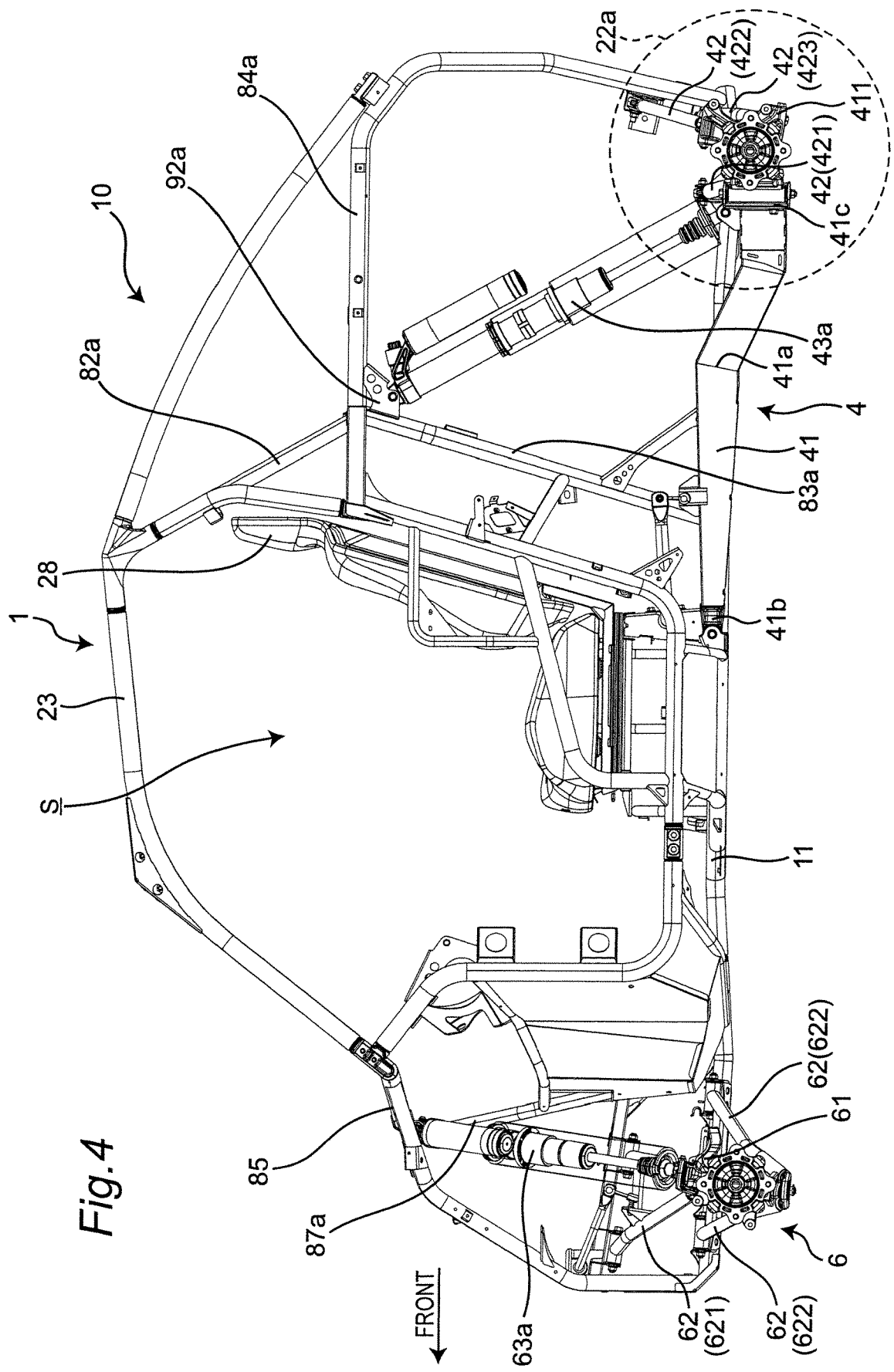
FIG. 4 is a left side view of the utility vehicle shown in FIG. 3.
Figure 5:
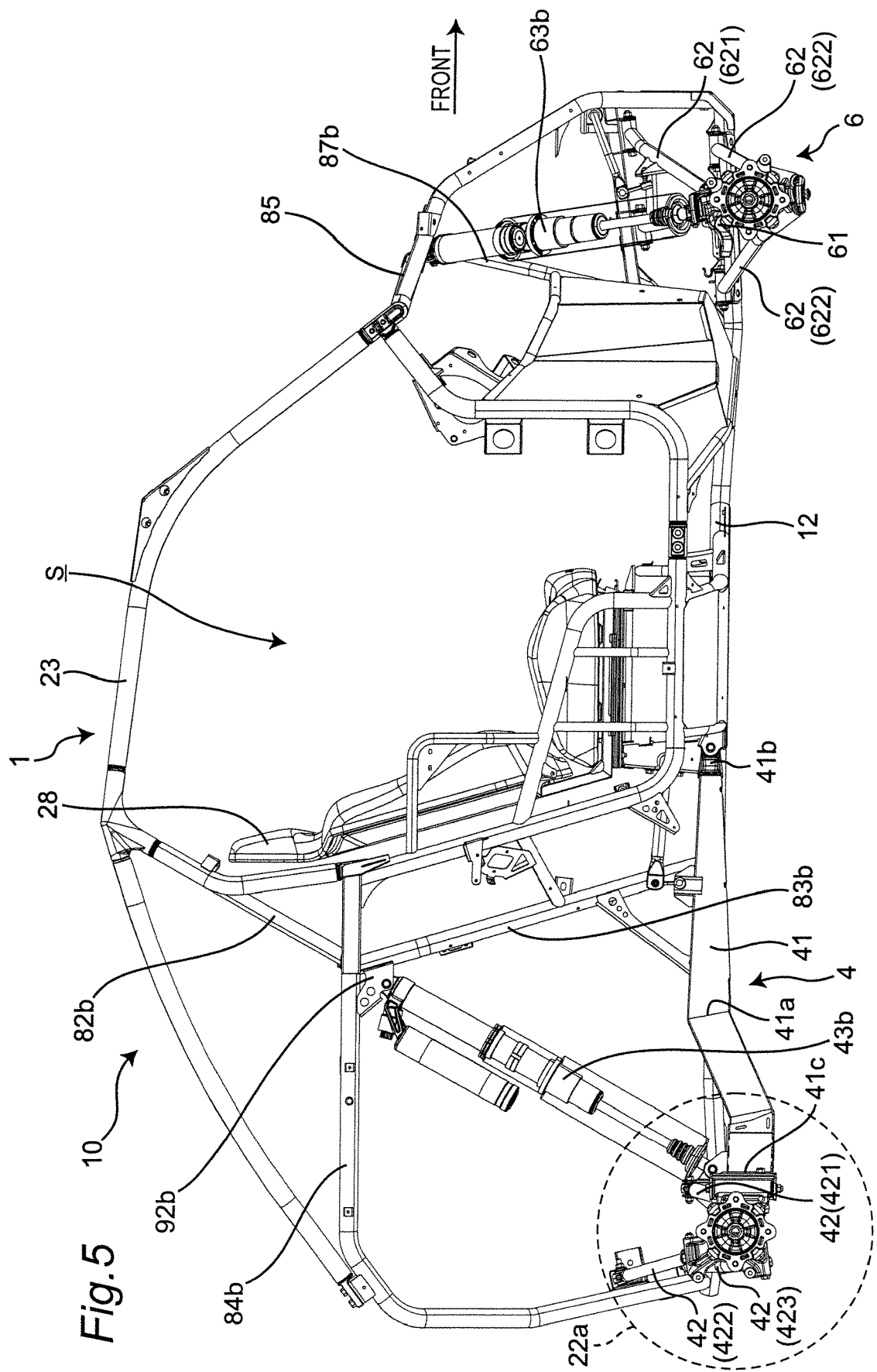
FIG. 5 is a right side view of the utility vehicle shown in FIG. 3.
Figure 12:
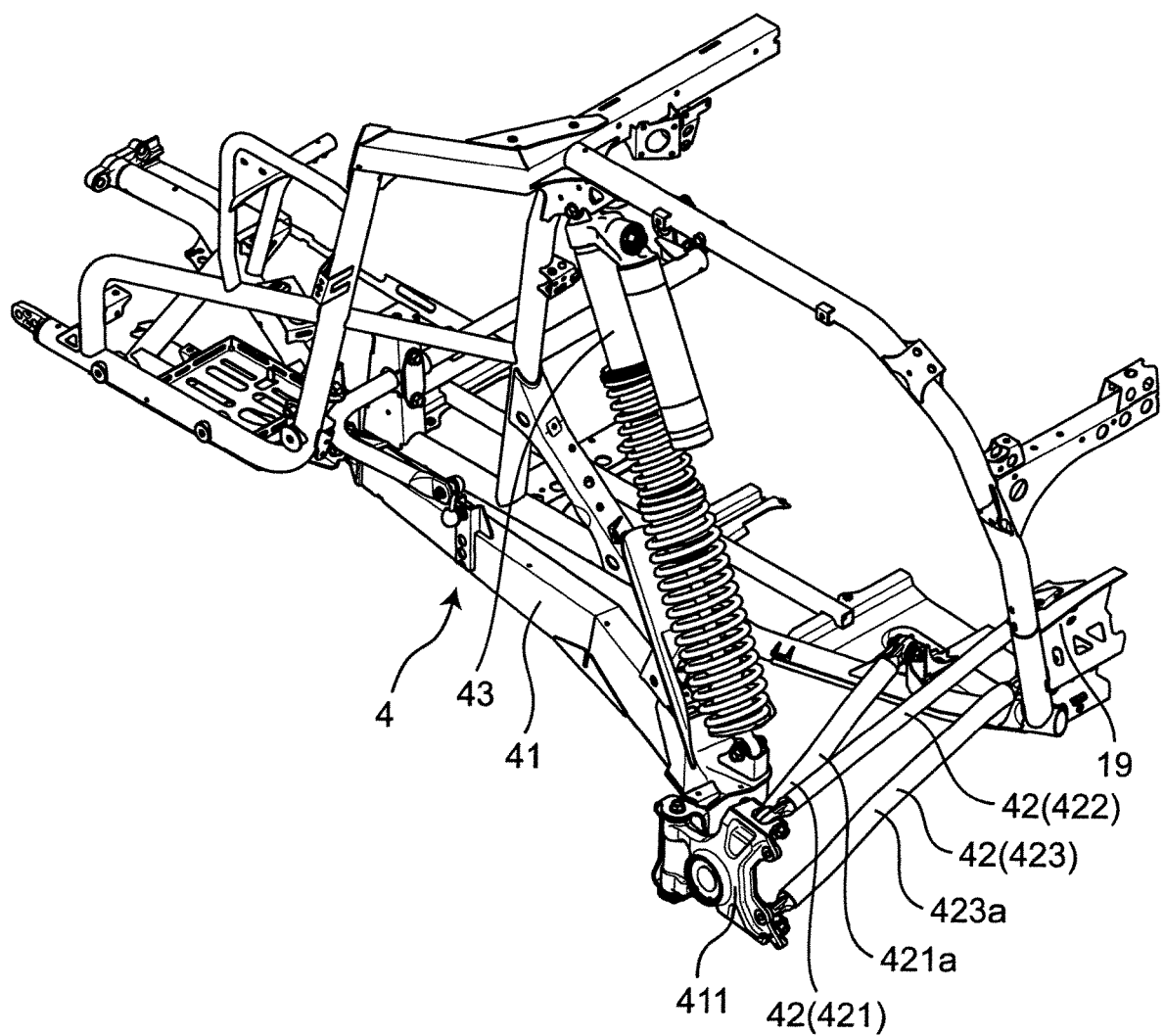
FIG. 12 is a perspective view of the suspension device.

FIG. 3 is a perspective view of the utility vehicle showing the supporting structure for a shock absorber of a suspension device, FIG. 4 is a left side view of the utility vehicle shown in FIG. 3, and FIG. 5 is a right side view of the utility vehicle shown in FIG. 3. As shown in FIG. 3 to FIG. 5, a pair of right and left independent-suspension-type rear-wheel-use suspension devices 4 which supports the pair of right and left rear wheels 22 in a vertically swingable manner is disposed below the cargo bed 25 and on both sides of the power unit 3. FIG. 12 is a perspective view of the suspension device 4.

The suspension device 4 includes: a trailing arm 41 which has a front end thereof supported on the vehicle body frame 1 and extends in a longitudinal direction; a knuckle 411 which supports a rear end of the trailing arm 41 and rotatably supports a hub of the rear wheel 22; a plurality of control rods 42 which extend in the vehicle width direction and support the knuckle 411 on the vehicle body frame 1; and a shock absorber 43 which elastically supports the trailing arm 41 on the vehicle body frame 1. A lower end of the shock absorber 43 is supported by the rear end of the trailing arm 41 within the wheel 22a of the rear wheel 22 as viewed in a side view of the utility vehicle 10.

The trailing arm 41 has a bent portion 41a that bends upward at an intermediate portion in the longitudinal direction. Specifically, the trailing arm 41 gradually extends upward in an inclined manner as the trailing arm 41 advances rearward from a front end 41b supported by the vehicle body frame 1, reaches the bent portion 41a, gradually extends downward in an inclined manner as the trailing arm 41 advances rearward from the bent portion 41a, and reaches a rear end 41c supported by the knuckle 411. The inclination angle of the portion of the trailing arm 41 located on the front side of the bent portion 41a with respect to a horizontal plane is smaller than the inclination angle of the portion of the trailing arm 41 located on the rear side of the bent portion 41a with respect to the horizontal plane, and the length from the front end 41b to the bent portion 41a is longer than the length from the bent portion 41a to the rear end 41c.

Each control rod 42 extends in the vehicle width direction. One end of the control rod 42 is supported by the vehicle body frame 1 by way of a universal joint, and the other end of the control rod 42 is supported by the knuckle 411. The control rods 42 are formed of a first rod 421, a second rod 422, and a third rod 423. The first rod 421 is positioned in front of the center of the knuckle 411, and the second rod 422 and the third rod 423 are positioned behind the center of the knuckle 411. The second rod 422 is supported by the knuckle 411 above the center of the knuckle 411, and the first rod 421 and the third rod 423 are supported by the knuckle 411 below the center of the knuckle 411. The second rod 422 is positioned above the first rod 421 and the third rod 423.

Each of the first rod 421 and the third rod 423 has a bent portion 421a, 423a that bends upward at an intermediate portion in the vehicle width direction. Specifically, the first rod 421 and the third rod 423 gradually extend downward in an inclined manner from inner ends in the vehicle width direction supported by the vehicle body frame 1 as the first rod 421 and the third rod 423 advance outward in the vehicle width direction, and reach the bent portions 421a, 423a, and extend downward in an inclined manner as the first rod 421 and the third rod 423 advance outward in the vehicle width direction from the bent portions 421a and 423a, and reach outer ends in the vehicle width direction supported by the knuckle 411. An inclination angle of portions of the first rod 421 and the third rod 423 positioned on an inner side of the bent portions 421a, 423a in the vehicle width direction with respect to a horizontal plane is set smaller than an inclination angle of portions of the first rod 421 and the third rod 423 positioned on an outer side of the bent portions 421a, 423a in the vehicle width direction with respect to the horizontal plane. Lengths of the first rod 421 and the third rod 423 from inner ends to the bent portions 421a, 423a are set larger than lengths of the first rod 421 and the third rod 423 from the bent portions 421a, 423a to outer ends. Further, the bent portion 421a of the first rod 421 and the bent portion 423a of the third rod 423 have a similar shape. In addition, the second rod 422 gradually extends downward in an inclined manner from an inner end in the vehicle width direction which is supported by the vehicle body frame 1 to an outer side in the vehicle width direction, and reaches an outer end in the vehicle width direction which is supported by the knuckle 411. The second rod 422 extends substantially in a straight line shape.

In each of the second rod 422 and the third rod 423 positioned behind the first rod 421, an inner end in the vehicle width direction is mounted on a front surface side of the rear end frame 19 of the utility vehicle 10. In addition, as viewed in a side view of the utility vehicle 10, all of the first rod 421, the second rod 422, and the third rod 423 are positioned within the wheel 22a of the rear wheel 22.

Figure 13:
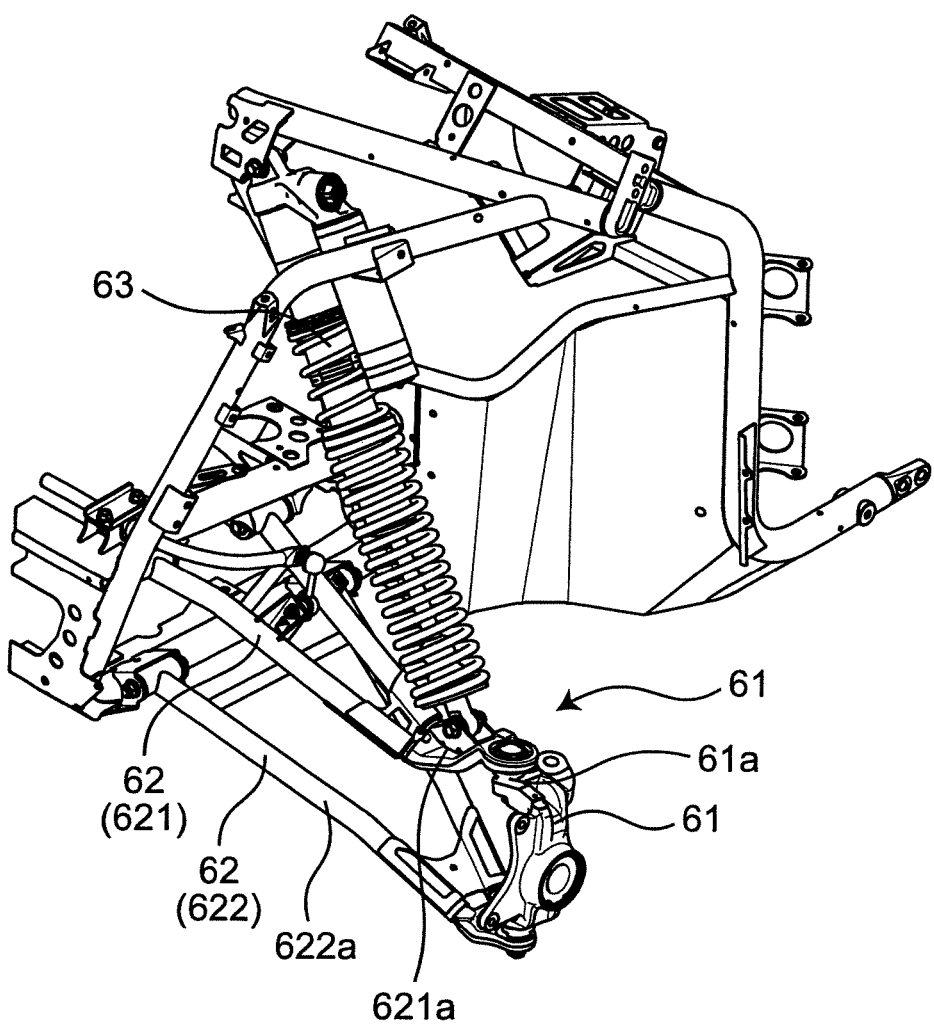
FIG. 13 is a perspective view of the suspension device.

A pair of right and left independent-suspension-type front-wheel-use suspension devices 6 which supports the pair of right and left front wheels 21 in a vertically swingable manner is disposed below the bonnet 26 and on both sides of a front-wheel-use final reduction gear (not shown in the drawing) which transmits a driving force to the front wheels 21. FIG. 13 is a perspective view of the suspension device 6. Each suspension device 6 includes: a knuckle 61 which supports a hub of the front wheel 21 in a rotatable manner; a plurality of control rods 62 which extend in the vehicle width direction and support the knuckle 61 on the vehicle body frame 1; and a shock absorber 63 which elastically supports the control rods 62 on the vehicle body frame 1.

Figure 14:
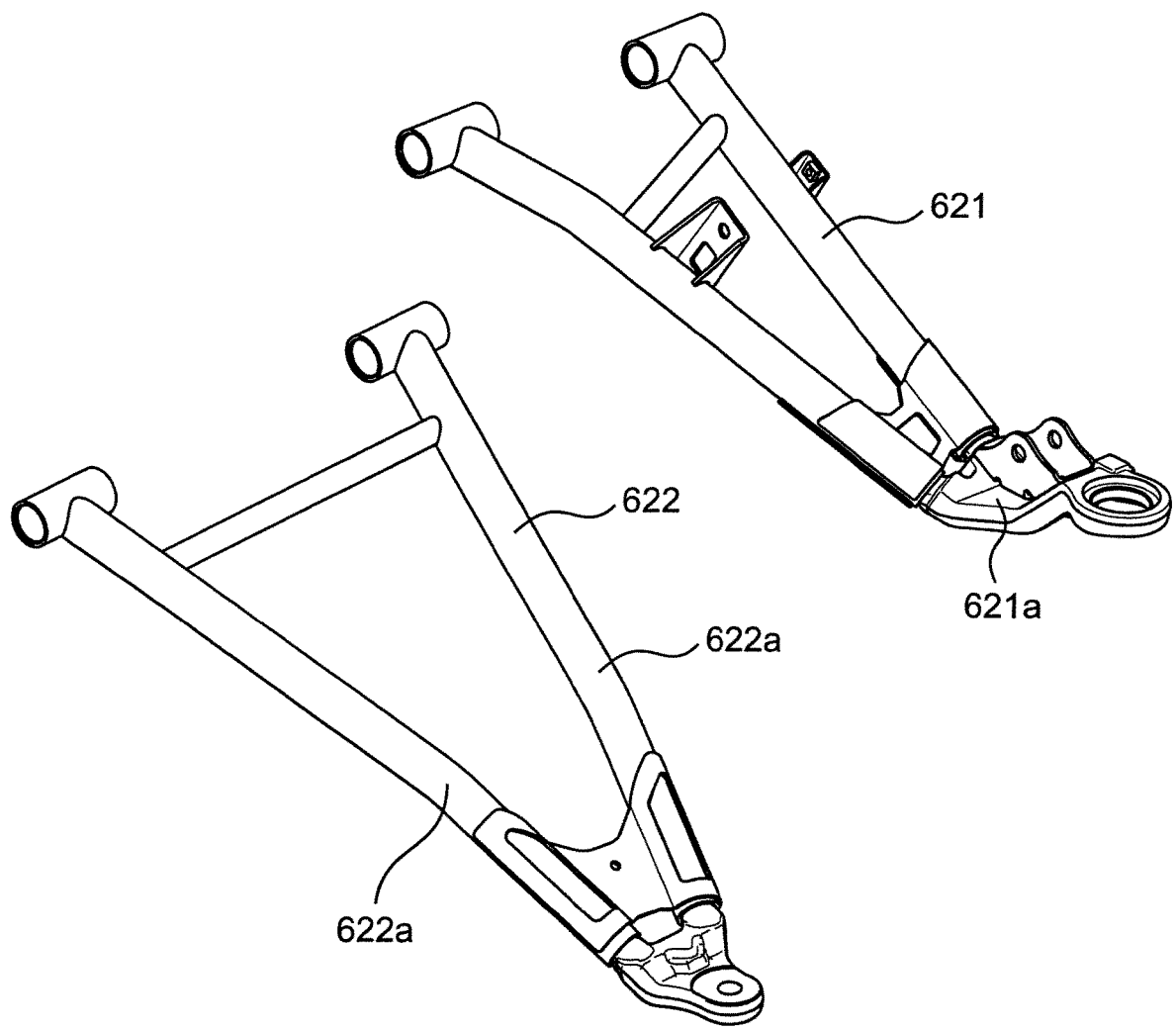
FIG. 14 is a perspective view of an upper arm and a lower arm.

The control rod 62 is divided in two from a connection portion which is connected with the knuckle 61 thus forming an upper arm 621 and a lower arm 622 which form a pair in the vertical direction. The upper arm 621 and a lower arm 622 extend inward in the vehicle width direction and are connected to the vehicle body frame 1. The upper arm 621 and the lower arm 622 have a substantially A shape respectively. FIG. 14 is a perspective view of the upper arm 621 and the lower arm 622. A recessed portion 621a that is recessed downward is formed on a portion at an outer side (with respect to a vehicle width) of the upper arm 621 in the vicinity of the connection portion which is connected with the knuckle 61. The lower end of the shock absorber 63 is supported by the recessed portion 621a.

A bottom surface of the recessed portion 621a is positioned substantially at the same height in the vertical direction as a support surface 61a on which the knuckle 61 supports the upper arm 621, or is positioned below the support surface 61a.

Figure 15:
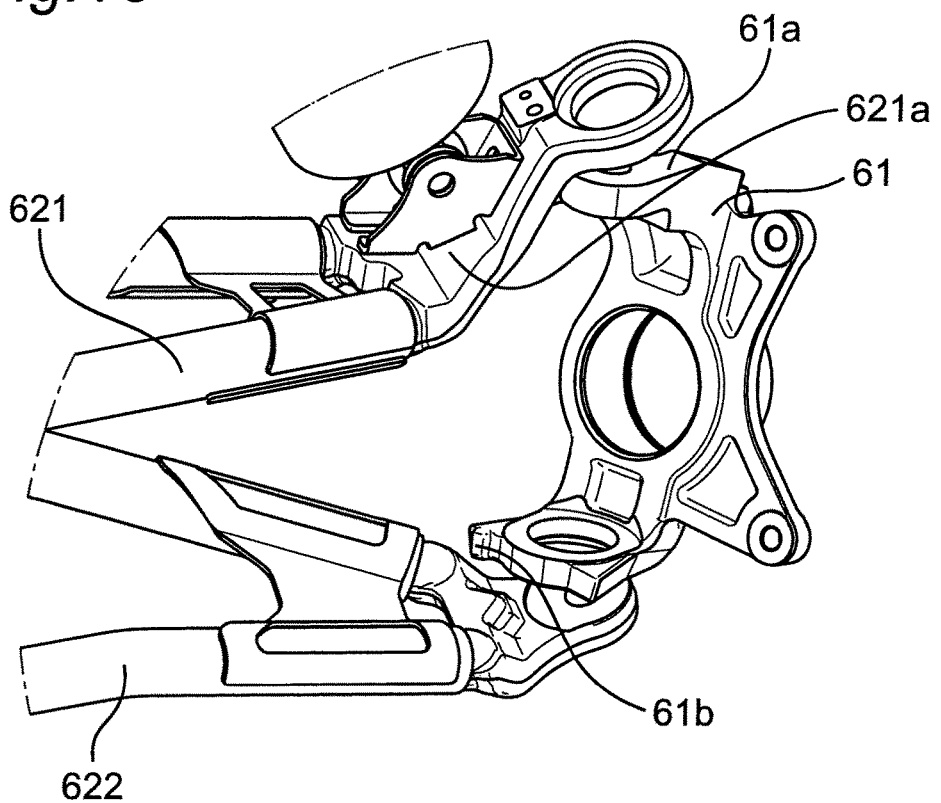
FIG. 15 is a perspective view of an area in the vicinity of a knuckle when a front wheel is steered to the maximum in a state where the shock absorber is maximally contracted.
Figure 16:
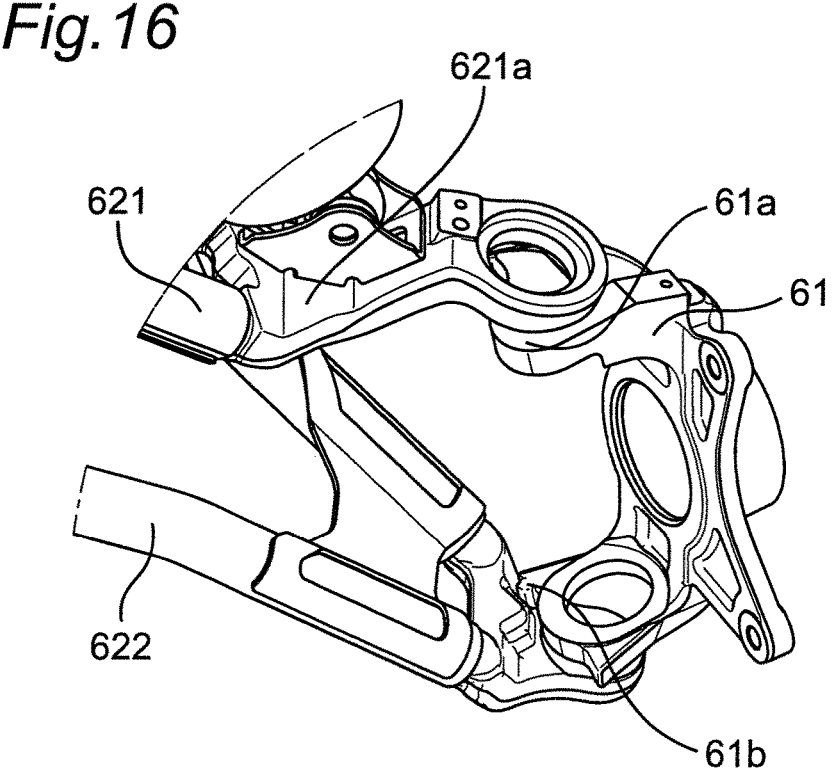
FIG. 16 is a perspective view of the area in the vicinity of the knuckle when the front wheel is steered in a state where the shock absorber is maximally extended.

A stopper 61b that regulates a displacement angle between the lower arm 622 and the knuckle 61 is formed on the knuckle 61. FIG. 15 is a perspective view of an area in the vicinity of the knuckle 61 when the front wheel 21 is steered maximally in a state where the shock absorber 63 is maximally contracted, and FIG. 16 is a perspective view of the area in the vicinity of the knuckle 61 when the front wheel 21 is steered in a state where the shock absorber 63 is maximally extended. As shown in FIG. 15, in a state where the shock absorber 63 is maximally contracted, there is no possibility that the stopper 61b of the knuckle 61 engages with the lower arm 622 even when the front wheel 21 is steered maximally. On the other hand, in a state where the shock absorber 63 is maximally extended, as shown in FIG. 16, the stopper 61b limits a displacement angle between the lower arm 622 and the knuckle 61 to a predetermined range in order to ensure the amount of wheel travel (tire stroke) of the front wheel 21. Specifically, the stopper 61b is formed of a projecting and recessed portion that can come into contact with the lower arm 622. In a state where the shock absorber 63 is maximally extended, when the wheel of the front wheel 21 is steered laterally so that an angle made by the lower arm 622 and the knuckle 61 becomes a predetermined angle, the projecting and recessed portion of the stopper 61b comes into contact with and engages with the lower arm 622. Accordingly, there is no possibility that the angle made by the knuckle 61 and the lower arm 622 exceeds the predetermined angle.

The lower arm 622 has a bent portion 622a that bends upward at an intermediate portion in the vehicle width direction. Specifically, the lower arm 622 gradually extends downward in an inclined manner from an inner end in the vehicle width direction which is supported by the vehicle body frame 1 as the lower arm 622 advances outward in the vehicle width direction, and reaches the bent portion 622a. As the lower arm 622 further advances outward in the vehicle width direction from the bent portion 622a, the lower arm 622 extends downwardly in an inclined manner and reaches an outer end in the vehicle width direction which is supported by the knuckle 61. Note that an inclination angle of a portion of the lower arm 622 positioned on an inner side of the bent portion 622a in the vehicle width direction with respect to a horizontal plane is set smaller than an inclination angle of a portion of the lower arm 622 positioned on an outer side of the bent portion 622a in the vehicle width direction with respect to the horizontal plane. A length of the lower arm 622 from an inner end to the bent portion 622a is set larger than a length of the lower arm 622 from the bent portions 622a to an outer end.

Figure 6:
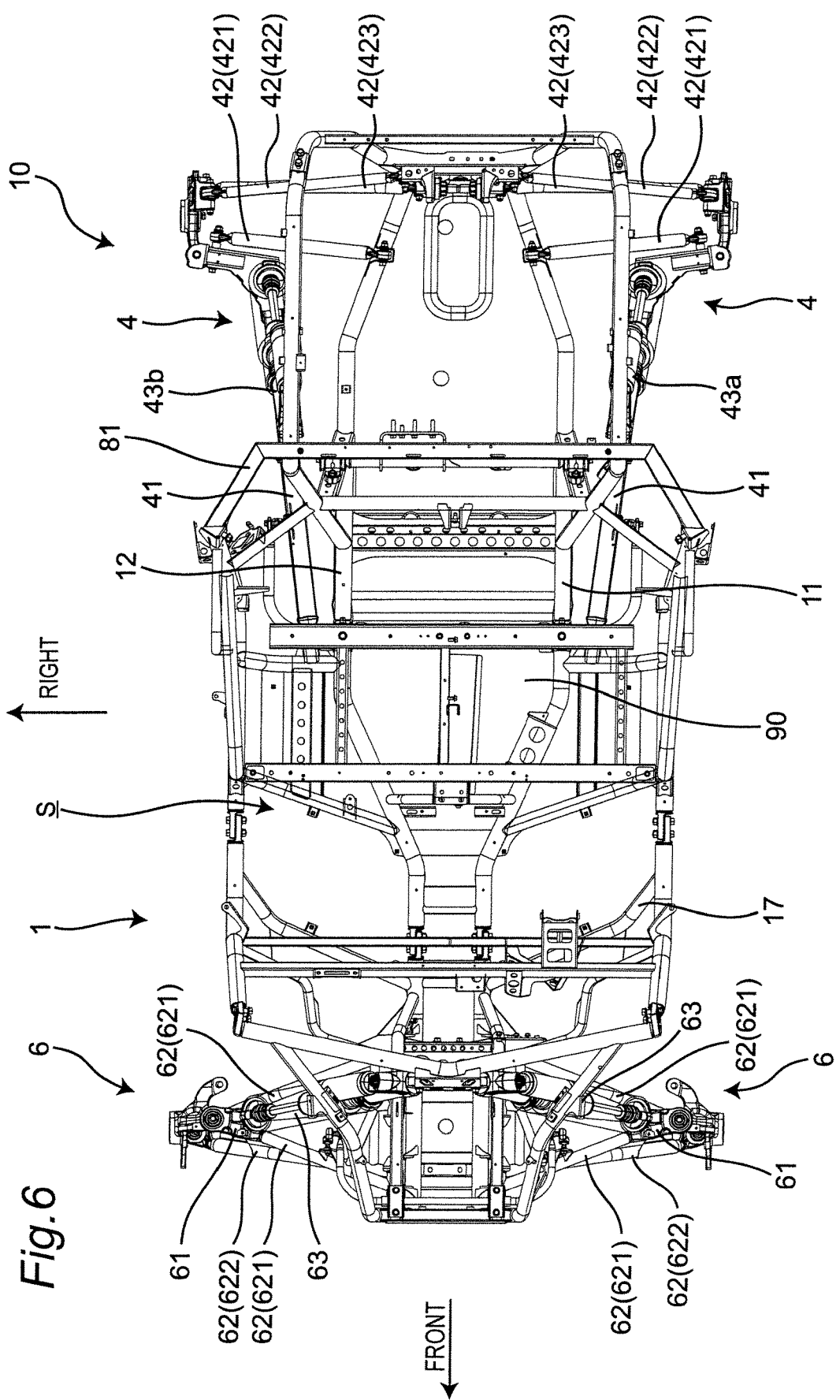
FIG. 6 is a top plan view of the utility vehicle shown in FIG. 3 in which a rollover protective structure (ROPS) and seats are omitted.

FIG. 6 is a top plan view of the utility vehicle shown in FIG. 3 where the ROPS 23 and the seats 28 are omitted. As shown in FIG. 6, the vehicle body frame 1 includes a first bottom frame 11 and a second bottom frame 12 which form a pair of left and right frames respectively on a bottom portion of the vehicle body frame 1. The first bottom frame 11 and the second bottom frame 12 extend substantially horizontally in the longitudinal direction and support a floor plate 90. The first bottom frame 11 and the second bottom frame 12 are main frames which are respectively formed of a circular cylindrical pipe frame.

The first bottom frame 11 and the second bottom frame 12 are positioned at a center portion in the vehicle width direction such that the first bottom frame 11 and the second bottom frame 12 approach closest to each other in the vehicle width direction in a front portion of the riding space S. The first bottom frame 11 and the second bottom frame 12 extend outward in the vehicle width direction in an inclined manner so as to be away from each other in the vehicle width direction as the first bottom frame 11 and the second bottom frame 12 extend rearward from the front portion of the riding space S. Further, the first bottom frame 11 and the second bottom frame 12 extend rearward in substantially parallel to each other in the longitudinal direction below the seats 28 respectively, and extend inward in the vehicle width direction in an inclined manner toward a rear side from a rear portion of the power unit 3 such that the first bottom frame 11 and the second bottom frame 12 approach each other in the vehicle width direction.

[Supporting Structure for Shock Absorber of Rear-Wheel-Use Suspension Device]

Figure 7:
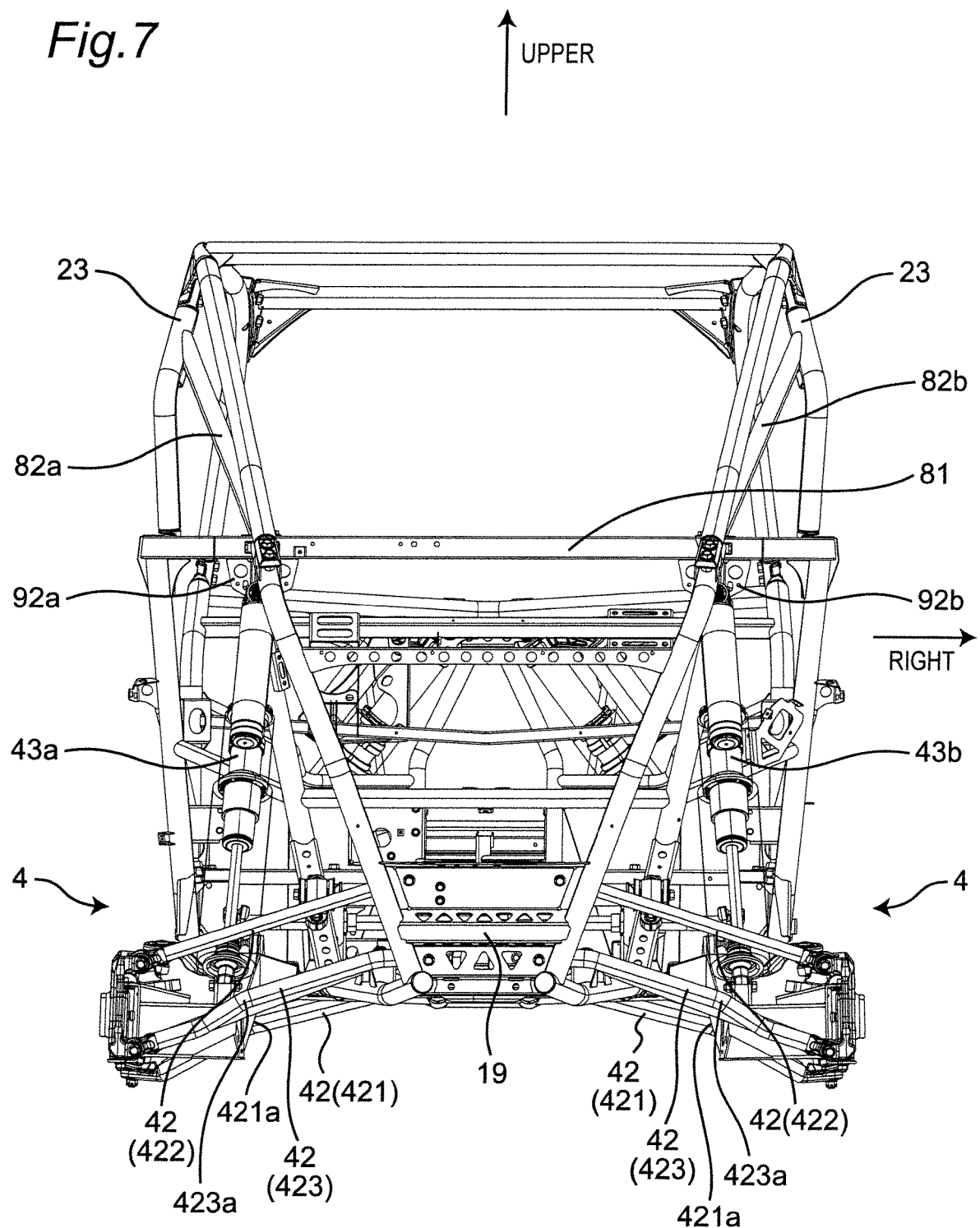
FIG. 7 is a rear view of the utility vehicle shown in FIG. 3 in which the seats are omitted.
Figure 8:
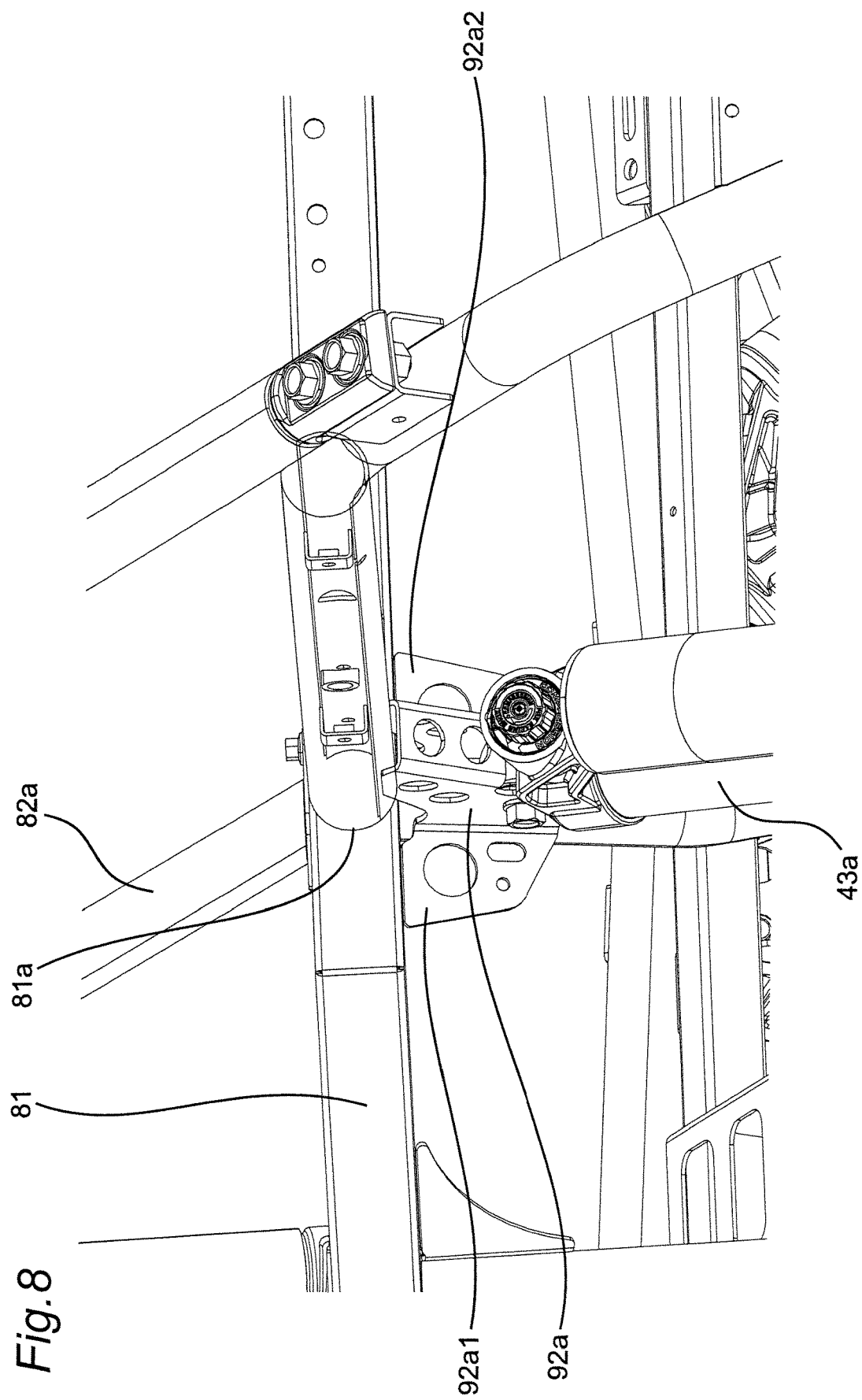
FIG. 8 is an enlarged view of an area in the vicinity of an upper end of the shock absorber.

FIG. 7 is a rear view of the utility vehicle shown in FIG. 3 in which the seats 28 are omitted, and FIG. 8 is an enlarged view of an area in the vicinity of an upper end of a left shock absorber 43a. As shown in FIG. 3 to FIG. 8, an upper end of the left shock absorber 43a of the rear-wheel-use suspension device 4 is supported on a lower surface of a support portion 81a of a panel frame 81 which extends in the vehicle width direction and supports the back panel 27 in the vehicle body frame 1 by way of a gusset 92a.

A reinforcing frame 82a which reinforces a strength of the ROPS 23 is mounted on an upper surface of the support portion 81a, and as shown particularly in FIG. 4, as viewed in a side view of the utility vehicle 10, the reinforcing frame 82a and the left shock absorber 43a are disposed so as to be arranged on one straight line.

A lower frame 83a which extends downward and has a lower end connected to the first bottom frame 11 is mounted on the lower surface of the support portion 81a. A rear frame 84a is mounted on a rear surface of the support portion 81a in such a manner that the rear frame 84a extends rearward, is bent downward at a rear end of the vehicle, extends downward, and is connected to a rear end of the first bottom frame 11. The gusset 92a is disposed between the lower frame 83a and the rear frame 84a, and connects the lower frame 83a and the rear frame 84a to each other.

An upper end of the right shock absorber 43b of the rear-wheel-use suspension device 4 is supported on a lower surface of a support portion 81b of the panel frame 81 which extends in the vehicle width direction and supports the back panel 27 by way of a gusset 92b.

A reinforcing frame 82b which reinforces a strength of the ROPS 23 is mounted on an upper surface of the support portion 81b. As shown particularly in FIG. 5, as viewed in a side view of the utility vehicle 10, the reinforcing frame 82b and the right shock absorber 43b are disposed so as to be arranged on one straight line.

A lower frame 83b which extends downward and has a lower end connected to the second bottom frame 12 is mounted on the lower surface of the support portion 81b. A rear frame 84b is mounted on a rear surface of the support portion 81b in such a manner that the rear frame 84b extends rearward, is bent downward at the rear end of the vehicle, extends downward, and is connected to a rear end of the second bottom frame 12. The gusset 92b is disposed between the lower frame 83b and the rear frame 84b, and connects the lower frame 83b and the rear frame 84b to each other.

As shown particularly in FIG. 8, the gusset 92a further includes, for supporting the panel frame 81 in a stable manner, support reinforcing portions 92a1, 92a2 which are disposed on both ends of the gusset 92a in the vehicle width direction and extend outward in the vehicle width direction. In the same manner as the gusset 92a, the gusset 92b also includes support reinforcing portions which are disposed on both ends of the gusset 92b in the vehicle width direction and extend outward in the vehicle width direction.

[Supporting Structure for Shock Absorber of Front-Wheel-Use Suspension Device]

Figure 9:
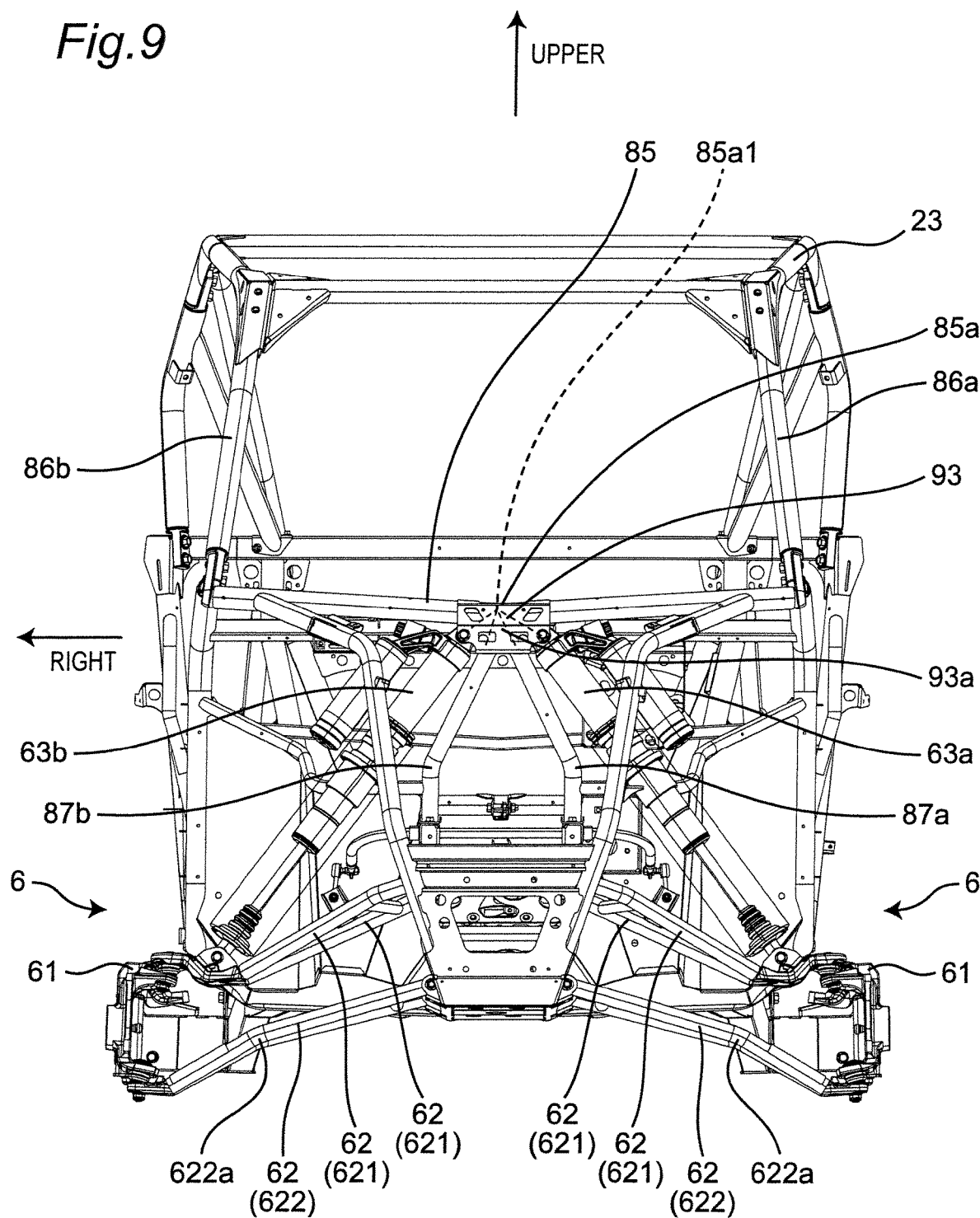
FIG. 9 is a front view of the utility vehicle shown in FIG. 3 in which the seats are omitted.
Figure 10:
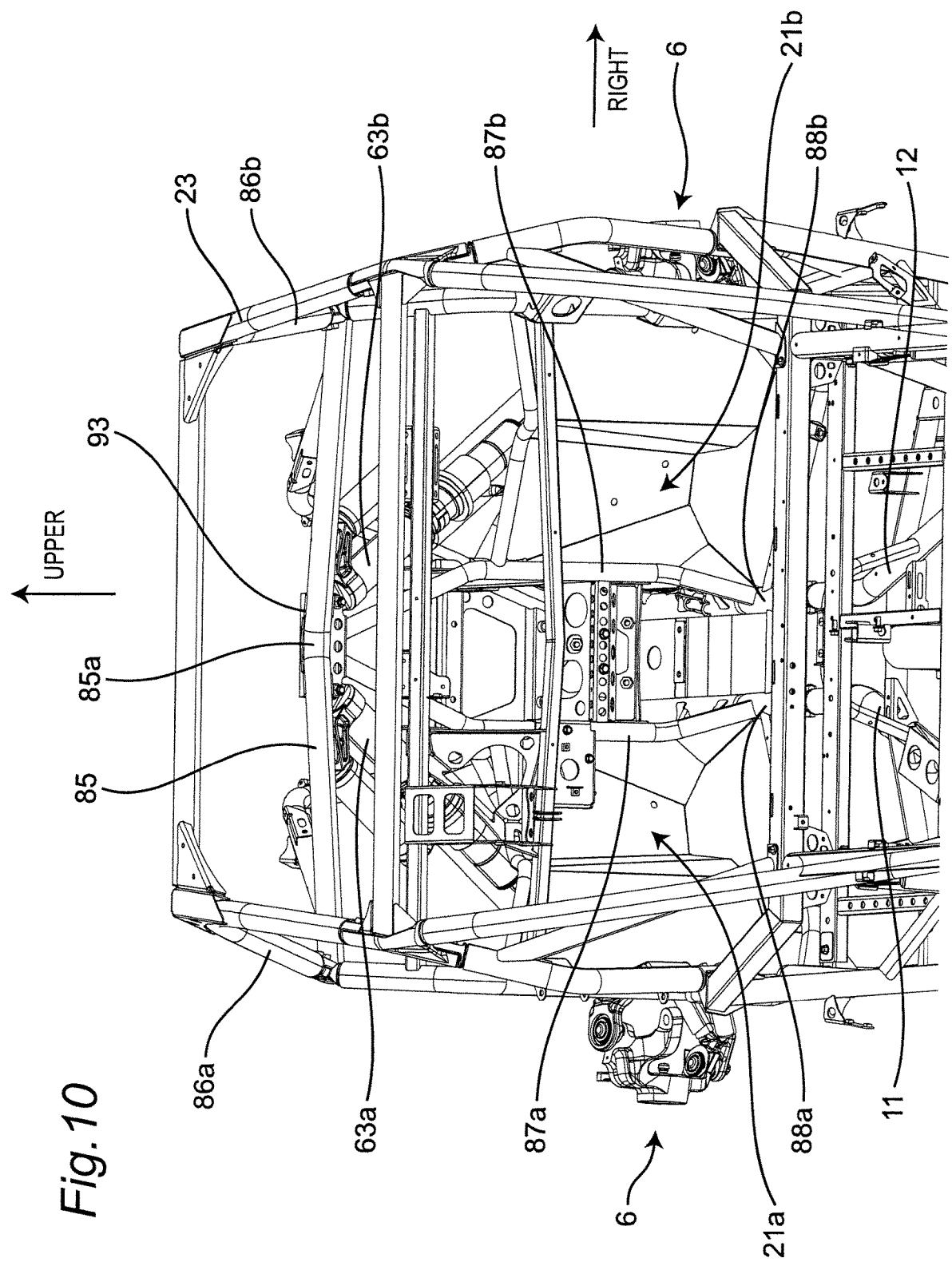
FIG. 10 is a rear perspective view of the utility vehicle shown in FIG. 3 in which the seats are omitted.

FIG. 9 is a front view of the utility vehicle shown in FIG. 3 in which the seats 28 are omitted, and FIG. 10 is a rear perspective view of the utility vehicle shown in FIG. 3 in which the seats 28 are omitted.

As shown in FIG. 9 and FIG. 10, an upper end of a left shock absorber 63a of the front-wheel-use suspension device 6 is supported on a support portion 85a of a bonnet frame (transverse frame) 85 which extends in the vehicle width direction, directly or indirectly supports the bonnet 26 or is positioned in the vicinity of the bonnet 26 by way of a bracket 93. An upper end of a right shock absorber 63b is also supported on the support portion 85a by way of the bracket 93.

The bracket 93 is mounted on the support portion 85a so as to surround the support portion 85a from below, and an upper surface of the support portion 85a is not covered by the bracket 93. The bonnet frame 85 penetrates the bracket 93. The bonnet frame 85 extends outward in the vehicle width direction from both sides of the bracket 93 in an upwardly inclined manner.

An upper end of a left end of the bonnet frame 85 is connected to a front frame 86a which is one of the ROPS forming a front wall of the riding space S, and an upper end of a right end of the bonnet frame 85 is connected to a front frame 86b which is one of the ROPS forming the front wall of the riding space S.

A lower portion of the bracket 93 forms a support portion 93a which supports the shock absorbers 63a, 63b. As viewed in a front view of the utility vehicle, the left shock absorber 63a is supported on a left end of the support portion 93a in the vehicle width direction, and the right shock absorber 63b is supported on a right end of the support portion 93a in the vehicle width direction.

Between the support portion for the left shock absorber 63a and the support portion for the right shock absorber 63b, upper ends of two lower frames 87a, 87b which extend in the vertical direction are mounted on the support portion 93a. The support portion 93a is supported on the lower frames 87a, 87b.

The lower frames 87a, 87b are frames respectively forming portions of tire houses 21a, 21b for the front wheels 21. The lower frames 87a, 87b are positioned at a center portion in the vehicle width direction such that the lower frames 87a, 87b approach closest to each other in the vehicle width direction at the support portion 93a, and extend outward in the vehicle width direction in an inclined manner such that the lower frames 87a, 87b are separated from each other in the vehicle width direction as the lower frames 87a, 87b extend downward from the support portion 93a. The lower frames 87a, 87b extend downward parallel to each other in upper portions of the tire houses 21a, 21b, and extend downward in lower portions of the tire houses 21a, 21b in an inwardly inclined manner in the vehicle width direction such that the lower frames 87a, 87b approach each other in the vehicle width direction. A lower end of the lower frame 87a is connected to the front end of the first bottom frame 11, and is connected to a bottom front frame 88a which extends frontward. A lower end of the lower frame 87b is connected to the front end of the second bottom frame 12, and is connected to a bottom front frame 88b which extends frontward.

As viewed in a side view of the utility vehicle 10, the shock absorbers 63a, 63b extend frontward in a downwardly inclined manner, the bonnet frame 85 extends rearward in an upwardly inclined manner, and the lower frames 87a, 87b extend rearward in a downwardly inclined manner. As viewed in a side view of the utility vehicle 10, the bonnet frame 85 and the lower frames 87a, 87b are disposed so as to make a right angle therebetween.

As viewed in a front view of the utility vehicle, extensions in an upward direction of the respective left and right shock absorbers 63a, 63b and extensions in an upward direction of the respective lower frames 87a, 87b are merged together at one point 85a1 on the bonnet frame 85.

According to the supporting structure for a shock absorber having the above configuration, the following advantageous effects can be acquired.

(1) The bonnet frame 85 extends outward in the vehicle width direction in an upwardly inclined manner from both sides of one bracket 93 on which both shock absorbers 63a, 63b are mounted and hence, a load transmitted to the shock absorbers 63a, 63b from below is easily transmitted to the bonnet frame 85. As a result, it is possible to provide the supporting structure for a shock absorber where loads from the shock absorbers 63a, 63b can be easily dispersed.

(2) The bonnet frame 85 is connected to the front frames 86a, 86b which form one of the ROPS 23 and hence, the bonnet frame 85 which receives loads from the shock absorbers 63a, 63b can transmit the loads to the ROPS 23 thus dispersing the loads more effectively.

(3) By supporting the bracket 93 from below by the lower frames 87a, 87b, a supporting strength of the bracket 93 can be enhanced.

(4) As viewed in a side view of the utility vehicle 10, the shock absorbers 63a, 63b extend frontward in a downwardly inclined manner, the bonnet frame 85 extends rearward in an upwardly inclined manner, and the lower frames 87a, 87b extend rearward in a downwardly inclined manner. With such a configuration, loads from the shock absorbers 63a, 63b can be easily transmitted to the bonnet frame 85 and the lower frames 87a, 87b.

(5) As viewed in a side view of the utility vehicle 10, the bonnet frame 85 and the lower frames 87a, 87b are disposed so as to make a right angle therebetween and hence, loads from the shock absorbers 63a, 63b can be more easily transmitted to the bonnet frame 85 and the lower frames 87a, 87b.

(6) As viewed in a front view of the utility vehicle 10, the extensions in the upward direction of the respective left and right shock absorbers 63a, 63b and the extensions in the upward direction of the lower frames 87a, 87b are merged together at one point on the bonnet frame 85 and hence, loads from the shock absorbers 63a, 63b can be easily transmitted to the bonnet frame 85 and the lower frames 87a, 87b.

(7) The reinforcing frame 82a, 82b which forms one of the ROPS 23 is connected to the support portion 81a, 81b on which the shock absorber 43a, 43b, respectively, is supported and hence, a load from the shock absorber 43a, 43b is easily transmitted to the ROPS 23. As a result, it is possible to provide the supporting structure for a shock absorber where a load from the shock absorber 43a, 43b can be easily dispersed.

(8) The shock absorber 43a, 43b and the reinforcing frame 82a, 82b are disposed so as to be arranged on one straight line respectively as viewed in a side view and hence, a load from the shock absorber 43a, 43b can be easily transmitted to the ROPS 23.

(9) The shock absorber 43a, 43b is supported on the support portion 81a, 81b by way of the gusset 92a, 92b respectively and hence, a supporting strength of the support portion 81a, 81b can be enhanced.

(10) The gusset 92a, 92b on which the shock absorber 43a, 43b is mounted respectively reinforces the shock absorber by connecting the lower frame 83a, 83b and the rear frame 84a, 84b to each other and hence, the supporting strength of the support portion 81a, 81b can be further enhanced.

(11) The gusset 92a, 92b on which the shock absorber 43a, 43b is mounted respectively reinforces the shock absorber 43a, 43b by connecting the lower frame 83a, 83b and the rear frame 84a, 84b to each other and hence, a strength of the support portion 81a, 81b of the panel frame 81 can be enhanced.

(12) The lower end of the shock absorber 43 is supported by the rear end of the trailing arm 41 within the wheel 22a as viewed in a side view of the utility vehicle 10. Accordingly, a total length of the shock absorber 43 can be surely increased and hence, a moving distance of the wheel 22a in a vertical direction can be surely increased.

(13) The trailing arm 41 has the bent portion 41a that bends upward at the intermediate portion in the longitudinal direction and hence, the position of the rear end 41c of the trailing arm 41 in the vertical direction can be lowered. Accordingly, a total length of the shock absorber 43 can be surely increased.

(14) The rods 421, 423 positioned on a lower side have the bent portions 421a, 423a that bend upward at the intermediate portions in the vehicle width direction. Accordingly, a possibility that an obstacle is caught by the rods 421, 423 can be reduced whereby drivability of the utility vehicle 10 on a rough road can be improved.

(15) The rods 422, 423 positioned on a rear side are mounted on the front surface side of the rear end frame 19 of the utility vehicle 10. Accordingly, a possibility that an obstacle is caught by the rods 422, 423 can be reduced whereby drivability of the utility vehicle 10 on a rough road can be improved.

(16) The first rod 421 and the third rod 423 are disposed below the second rod 422, and the bent portion 421a of the first rod 421 and the bent portion 423a of the third rod 423 have a similar shape. Accordingly, a possibility that an obstacle is caught by the first rod 421 and the third rod 423 which form the lower rods can be reduced whereby drivability of the utility vehicle 10 on a rough road can be improved.

(17) As viewed in a side view of the utility vehicle 10, the first rod 421, the second rod 422, and the third rod 423 are positioned in the wheel 22a. Accordingly, the lengths of the first rod 421, the second rod 422, and the third rod 423 in the vehicle width direction can be surely increased and hence, the toe controllability of the wheel 22 can be improved.

(18) The lower end of the shock absorber 63 is supported by the recessed portion 621a of the upper arm 621. Accordingly, a total length of the shock absorber 63 can be surely increased and hence, a moving distance of the wheel in a vertical direction can be surely increased.

(19) The bottom surface of the recessed portion 621a is set substantially at the same height in the vertical direction as the support surface 61a on which the knuckle 61 supports the upper arm 621, or set below the support surface 61a. Accordingly, a total length of the shock absorber 63 can be surely increased while preventing lowering of a support strength of the knuckle 61 for supporting the upper arm 621.

(20) The upper end of the shock absorber 63 is supported by a portion of the bonnet frame 85 extending in the vehicle width direction in the vicinity of the center portion of the bonnet frame 85 in the vehicle width direction. Accordingly, a height of the bonnet can be suppressed while ensuring a sufficient total length of the shock absorber 63 and hence, it is possible to prevent the shock absorber 63 from obstructing visibility on a front side.

(21) The stopper 61b that limits a displacement angle between the lower arm 622 and the knuckle 61 is formed on the knuckle 61. Accordingly, by limiting the displacement angle between the lower arm 622 and the knuckle 61 within the predetermined range in a state where the shock absorber 63 is maximally extended, the amount of wheel travel (tire stroke) of the front wheel 21 can be ensured.

(22) The lower arm 622 has the bent portion 622a that bends upward at the intermediate portion in the vehicle width direction. Accordingly, a possibility that an obstacle is caught by the lower arm 622 can be reduced and hence, drivability of the utility vehicle 10 on a rough road can be improved.

In the above embodiment, the shock absorber 43a, 43b and the reinforcing frame 82a, 82b respectively are disposed so as to be arranged on one straight line as viewed in a side view. However, the shock absorber 43a, 43b and the ROPS may be disposed so as to be arranged on one straight line as viewed in a front view.

Figure 11:
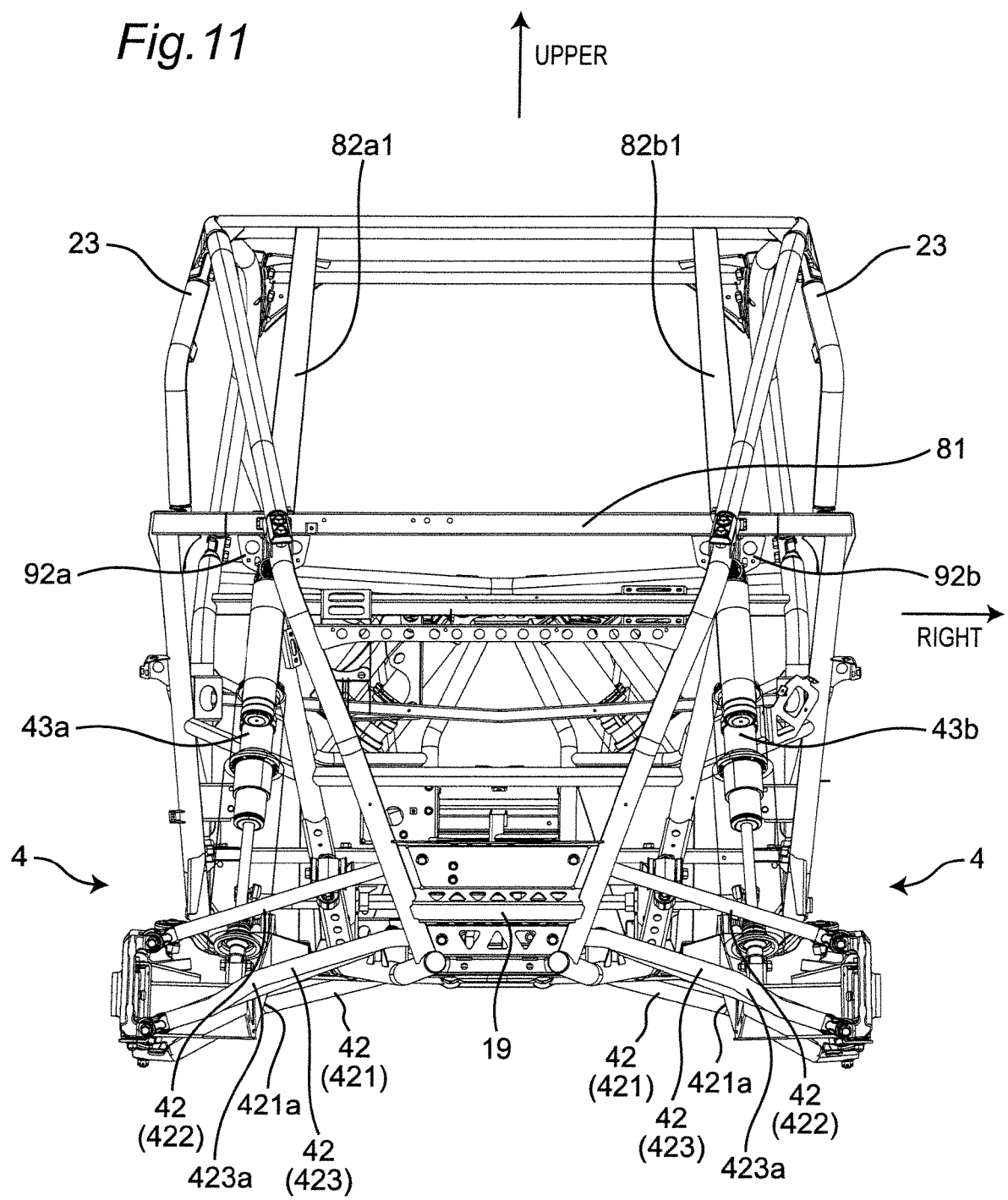
FIG. 11 is a rear view of a utility vehicle when the shock absorber and the ROPS are disposed so as to be arranged on one straight line as viewed in a front view.

FIG. 11 is a rear view of the utility vehicle 10 when the shock absorber 43a, 43b and the ROPS are disposed so as to be arranged on one straight line as viewed in a front view. As shown in FIG. 11, the upper end of the left shock absorber 43a is supported on the lower surface of the support portion 81a of the panel frame 81 which extends in the vehicle width direction and supports the back panel 27 in the vehicle body frame 1 by way of the gusset 92a.

A reinforcing frame 82a1 which reinforces a strength of the ROPS 23 is mounted on the upper surface of the support portion 81a, and the reinforcing frame 82a1 and the left shock absorber 43a are disposed so as to be arranged on one straight line as viewed in a rear view of the utility vehicle 10.

The upper end of the right shock absorber 43b is supported on the lower surface of the support portion 81b of the panel frame 81 which extends in the vehicle width direction and supports the back panel 27 in the vehicle body frame 1 by way of the gusset 92b.

A reinforcing frame 82b1 which reinforces a strength of the ROPS 23 is mounted on the upper surface of the support portion 81b, and the reinforcing frame 82b1 and the right shock absorber 43b are disposed so as to be arranged on one straight line as viewed in a rear view of the utility vehicle 10.

With the configuration, the shock absorber 43a, 43b and the reinforcing frame 82a1, 82b1 are disposed so as to be arranged on one straight line as viewed in a front view, respectively, and hence, a load from the shock absorber 43a, 43b can be more easily transmitted to the ROPS 23.

In the above embodiment, the shock absorbers 43a, 43b of the rear-wheel-use suspension device 4 are supported on the panel frame 81 which supports the back panel 27. However, a frame on which the shock absorbers 43a, 43b are supported is not limited to the panel frame 81, and may be a vehicle body frame respectively.

In the above embodiment, the shock absorbers 63a, 63b of the front-wheel-use suspension device 6 are supported on the bonnet frame 85 which supports the bonnet 26. However, a frame on which the shock absorbers 63a, 63b are supported is not limited to the bonnet frame, and may be a vehicle body frame which extends in the vehicle width direction.

In the above embodiment, the bonnet frame 85 is formed such that the bonnet frame 85 penetrates the bracket 93. However, the bonnet frame 85 may be split into two by the bracket 93, and each split bonnet frame portion may be connected to the bracket 93.

In the above embodiment, the bracket 93 surrounds the bonnet frame 85 from below and does not cover the upper surface of the support portion 85a of the bonnet frame 85. However, the bracket 93 may be configured to surround the whole circumference of the support portion 85a.

In the above embodiment, the supporting structure for a shock absorber of the rear-wheel-use suspension device 4 is not limited to the supporting structure for a rear-wheel-use shock absorber, and may be applied to the supporting structure for a front-wheel-use shock absorber. In the same manner, the supporting structure for a shock absorber of the front-wheel-use suspension device 6 in the above-mentioned embodiment is not limited to the supporting structure for a front-wheel-use shock absorber, and may be applied to the supporting structure for a rear-wheel-use shock absorber.

The various modifications and alterations are also conceivable without departing from the spirit and scope of the present invention described in claims.

What is claimed is:

1. A suspension structure of a utility vehicle comprising:
   a shock absorber;
   a knuckle; and
   an upper arm and a lower arm which connects the knuckle to a vehicle body frame of the utility vehicle,
   wherein a recessed portion is recessed downward and is formed on the upper arm,
   wherein a lower end of the shock absorber is supported by the recessed portion, and
   wherein the recessed portion is formed at an outer side of the upper arm with respect to a vehicle width direction.

2. The suspension structure according to claim 1, wherein a stopper configured to regulate a displacement angle between the lower arm and the knuckle is formed on the knuckle.

3. The suspension structure according to claim 2, wherein the stopper is configured to engage with the lower arm and limit the displacement angle in a state in which the shock absorber is maximally extended.

4. The suspension structure according to claim 1, wherein the lower arm has a bent portion that bends upward at an intermediate portion of the lower arm in the vehicle width direction.

5. A suspension structure of a utility vehicle comprising:
   a shock absorber;
   a knuckle; and
   an upper arm and a lower arm which connects the knuckle to a vehicle body frame of the utility vehicle,
   wherein a recessed portion is recessed downward and is formed on the upper arm,
   wherein a lower end of the shock absorber is supported by the recessed portion, and
   wherein a bottom surface of the recessed portion is positioned substantially at the same height in a vertical direction as a support surface of the knuckle on which the knuckle supports the upper arm, or the bottom surface of the recessed portion is below the support surface.

6. The suspension structure according to claim 5, wherein a stopper configured to regulate a displacement angle between the lower arm and the knuckle is formed on the knuckle.

7. The suspension structure according to claim 6, wherein the stopper is configured to engage with the lower arm and limit the displacement angle in a state in which the shock absorber is maximally extended.

8. The suspension structure according to claim 5, wherein the lower arm has a bent portion that bends upward at an intermediate portion of the lower arm in the vehicle width direction.

9. A suspension structure of a utility vehicle comprising:
   a shock absorber;
   a knuckle; and
   an upper arm and a lower arm which connects the knuckle to a vehicle body frame of the utility vehicle,
   wherein a recessed portion is recessed downward and is formed on the upper arm,
   wherein a lower end of the shock absorber is supported by the recessed portion, and
   wherein an upper end of the shock absorber extends in a vehicle width direction, and the upper end is supported by a portion of a bonnet frame in a vicinity of a center portion of the bonnet frame in the vehicle width direction, the bonnet frame being positioned in a vicinity of a bonnet.

10. The suspension structure according to claim 9, wherein a stopper configured to regulate a displacement angle between the lower arm and the knuckle is formed on the knuckle.

11. The suspension structure according to claim 10, wherein the stopper is configured to engage with the lower arm and limit the displacement angle in a state in which the shock absorber is maximally extended.

12. The suspension structure according to claim 9, wherein the lower arm has a bent portion that bends upward at an intermediate portion of the lower arm in the vehicle width direction.

* * * * *